United States Patent
Zhang et al.

(10) Patent No.: US 10,382,559 B2
(45) Date of Patent: *Aug. 13, 2019

(54) METHOD AND EQUIPMENT FOR COORDINATED CONTROL IN INTELLIGENT TRAFFIC CLOUD CONTROL SYSTEM

(71) Applicant: KYLAND TECHNOLOGY CO.,LTD., Beijing (CN)

(72) Inventors: Fusheng Zhang, Beijing (CN); Guozhen Ma, Beijing (CN); Zhiwei Yan, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 67 days.

This patent is subject to a terminal disclaimer.

(21) Appl. No.: 15/367,721

(22) Filed: Dec. 2, 2016

(65) Prior Publication Data

US 2018/0091599 A1 Mar. 29, 2018

(30) Foreign Application Priority Data

Sep. 26, 2016 (CN) .......................... 2016 1 0851719

(51) Int. Cl.
*G06F 15/16* (2006.01)
*H04L 29/08* (2006.01)
(Continued)

(52) U.S. Cl.
CPC .......... *H04L 67/125* (2013.01); *G08G 1/0116* (2013.01); *G08G 1/0133* (2013.01);
(Continued)

(58) Field of Classification Search
CPC .............................. H04L 67/125; H04L 43/16
See application file for complete search history.

(56) References Cited

U.S. PATENT DOCUMENTS 6,317,058 B1 11/2001 Lemelson et al.
8,928,493 B2 1/2015 Mantalvanos
(Continued)

FOREIGN PATENT DOCUMENTS

JP 2003016581 A 1/2003
JP 2006259833 A 9/2006
(Continued)

*Primary Examiner* — Hua Fan
(74) *Attorney, Agent, or Firm* — Arent Fox LLP; Michael Fainberg

(57) ABSTRACT

The invention relates to the field of controlling road traffic, and particularly to a method for coordinated control in an intelligent traffic cloud control system, and in the method, a central system can perform global coordinated control, or a control server can perform local coordinated control, and if the control server performs local coordinated control, then the control server can distribute a pertinent coordinated control strategy for a particular condition in a service area, thus alleviating the burden on the central system, and reducing the overall amount of data information to be transmitted in the intelligent traffic system, and also shortening the period of time for transmitting the data information so as to improve the efficiency of generating and enforcing the coordinated control strategy, and to address the problem of a traffic jam at a crossing effectively in a real-time manner.

10 Claims, 4 Drawing Sheets

(51) Int. Cl.
  *G08G 1/01*   (2006.01)
  *G08G 1/081*  (2006.01)
  *H04L 12/26*  (2006.01)
(52) U.S. Cl.
  CPC .......... *G08G 1/0145* (2013.01); *G08G 1/081* (2013.01); *H04L 43/16* (2013.01)

(56) References Cited

U.S. PATENT DOCUMENTS

| | | |
|---|---|---|
| 2003/0020633 A1 | 1/2003 | Lee |
| 2008/0074289 A1 | 3/2008 | Sauder et al. |
| 2008/0238720 A1 | 10/2008 | Lee |
| 2011/0191011 A1 | 8/2011 | McBride et al. |
| 2012/0179742 A1* | 7/2012 | Acharya .................. H04N 7/18 709/202 |
| 2016/0050269 A1* | 2/2016 | Botticelli ............ H04L 67/1076 709/218 |

FOREIGN PATENT DOCUMENTS

| | | |
|---|---|---|
| JP | 2006260483 A | 9/2006 |
| JP | 2008092279 A | 4/2008 |
| JP | 2011090554 A | 5/2011 |
| JP | 2011514584 A | 5/2011 |
| JP | 2015184821 A | 10/2015 |
| JP | 2015230579 A | 12/2015 |
| WO | 2005010846 A | 2/2005 |
| WO | 2014/104869 A1 | 7/2014 |
| WO | 2016127803 A1 | 8/2016 |
| WO | 2016127950 A1 | 8/2016 |

* cited by examiner

METHOD AND EQUIPMENT FOR COORDINATED CONTROL IN INTELLIGENT TRAFFIC CLOUD CONTROL SYSTEM

CROSS-REFERENCES TO RELATED APPLICATIONS

This application claims the benefit of Chinese Patent Application No. 201610851719.5, filed with the State Intellectual Property Office of People's Republic of China on Sep. 26, 2016 and entitled "method and equipment for coordinated control in an intelligent traffic cloud control system", which is hereby incorporated by reference in its entirety.

FIELD

The present invention relates to the field of controlling road traffic, and particularly to a method and equipment for coordinated control in an intelligent traffic cloud control system.

BACKGROUND

As there are an increasing number of traffic vehicles, there are increasingly serious traffic jams in our city, and if the increasingly serious traffic jams in our city are addressed simply by expanding the roads, and traditionally managing and controlling the roads through signaling, then the cost will be high, and also there will be a limited effect of alleviating the traffic jams, and improving the efficiency of traffic transportation, so the increasingly serious traffic jams in our city can not be addressed effectively. Moreover traffic flows, and other traffic information of respective traffic crossings are not periodical and independent of each other, but somewhat associated with each other, so it will be crucial to address effectively the increasingly serious traffic jams in our city by improving the level of controlling the traffic through the existing road facilities taking into account the association between the respective adjacent traffic crossings.

Referring to FIG. 1, an intelligent traffic cloud control system includes a central system and a plurality of control servers, and in the intelligent traffic cloud control system, the control servers are responsible for acquiring field real-time information of respective crossings, and transmitting the acquired field real-time information to the central system, and the central system performs calculation, control, and other functions, thus resulting in a considerable workload of, and a heavy burden on the central system; and after the central system performs calculation on the field real-time information, the central system further transits the processed control information to the respective control server, thus prolonging the transmission of the data, so that suddenly occurring conditions at the respective crossings cannot be handled effectively in a real-time manner.

As can be apparent, in the prior art, the control servers can not perform calculation, control, etc., on the field real-time information, and all of these functions have to be performed by the central system, thus resulting in a considerable workload of, and a heavy burden on the central system, and also a poor effect of coordinated control among the respective control servers.

In view of this, it is desirable to devise a novel method for coordinated control in an intelligent traffic cloud control system so as to address the drawbacks above.

SUMMARY

Embodiments of the invention provide a novel method and equipment for coordinated control in an intelligent traffic cloud control system so as to address the problems in the prior art of a considerable workload of, and a heavy burden on the central system in the intelligent traffic cloud control system, and of the poor effect of coordinated control among the respective control servers.

Particular technical solutions according to the embodiments of the invention are as follows:

An embodiment of the invention provides a method for coordinated control in an intelligent traffic cloud control system including at least a plurality of control servers, and a plurality of IP-enabled field devices connected with the control servers over IP address based broadband buses, wherein the method includes:

distributing, by a first control server, subscription messages to the other control servers satisfying a preset condition;

receiving, by the first control server, information acquired by the IP-enabled field devices, and corresponding processing results, reported by the respective other control servers in response to the subscription messages; and generating, by the first control server, a corresponding coordinated control strategy based upon the obtained information reported by the IP-enabled field devices, and corresponding processing results, and transmitting the generated coordinated control strategy respectively to the other corresponding control servers.

Optionally distributing, by the first control server, the subscription messages to the other control servers satisfying the preset condition includes:

distributing, by the first control server, the subscription messages to the other control servers satisfying the preset condition upon determining that a preset trigger condition is satisfied;

wherein the preset trigger condition includes:

that the first control server determines that a specified event is occurring, according to collected state detection information and/or the information acquired by the IP-enabled field devices.

Optionally distributing, by the first control server, the subscription messages to the other control servers satisfying the preset condition includes:

distributing, by the first control server, the subscription messages to the other control servers in a specified range surrounding the first control server.

An embodiment of the invention provides an equipment for coordinated control in an intelligent traffic cloud control system including at least a plurality of control servers, and a plurality of IP-enabled field devices connected with the control servers over IP address based broadband buses, wherein the equipment is a first control server, and the equipment includes:

a distributing unit configured to distribute subscription messages to the other control servers satisfying a preset condition;

a receiving unit configured to receive information acquired by the IP-enabled field devices, and corresponding processing results, reported by the respective other control servers in response to the subscription messages; and a processing unit configured to generate a corresponding coordinated control strategy based upon the obtained information reported by the IP-enabled field devices, and corresponding processing results, and to transmit the generated coordinated control strategy respectively to the other corresponding control servers.

Optionally the distributing unit configured to distribute the subscription messages to the other control servers satisfying the preset condition is configured:

to distribute the subscription messages to the other control servers satisfying the preset condition upon determining that a preset trigger condition is satisfied;

wherein the preset trigger condition includes:

that it is determined that a specified event is occurring, according to collected state detection information and/or the information acquired by the IP-enabled field devices.

Optionally the distributing unit configured to distribute the subscription messages to the other control servers satisfying the preset condition is configured:

to distribute the subscription messages to the other control servers in a specified range surrounding the first control server.

An embodiment of the invention provides a method for coordinated control in an intelligent traffic cloud control system including at least a central system, a plurality of control servers, and a plurality of IP-enabled field devices, wherein the central system is connected with the control servers over a network, and the IP-enabled field devices are connected with the control servers over IP address based broadband buses; and the method includes:

detecting, by the central system, the states of respective control servers in a service area, and selecting a temporary primary node based upon state detection information; and triggering, by the central system, the temporary primary node to distribute subscription messages to the control servers satisfying a preset condition, to generate a corresponding coordinated control strategy according to information acquired by the IP-enabled field devices, and corresponding processing results, reported by the respective control servers in response to the subscription messages, and to transmit the generated coordinated control strategy respectively to the corresponding control servers.

Optionally selecting, by the central system, the temporary primary node based upon the state detection information includes:

selecting, by the central system, the central system as the temporary primary node upon determining that the size of an area with a traffic jam in the service area reaches a first preset threshold, based upon the obtained state detection information; or selecting, by the central system, the central system as the temporary primary node upon determining that the size of an area with a traffic jam in the service area does not reach a first preset threshold, and the number of control servers in the area with the traffic jam reaches a second preset threshold, based upon the obtained state detection information; or selecting, by the central system, one of the control servers in an area with a traffic jam in the service area as the temporary primary node upon determining that the size of the area with the traffic jam does not reach a first preset threshold, and the number of control servers in the area with the traffic jam does not reach a second preset threshold, based upon the obtained state detection information.

Optionally the method further includes:

selecting, by the central system, the central system as the temporary primary node upon determining that a preset urgent event is occurring.

Optionally selecting, by the central system, one of the control servers in the area with the traffic jam as the temporary primary node includes:

calculating, by the central system, the ratio of a state parameter of each control server in the area with the traffic jam to a preset reference state parameter respectively based upon the obtained state detection information, selecting one of the calculated respective ratios according to a preset selection criterion, and determining the control server corresponding to the selected ratio as the temporary primary node.

Optionally triggering, by the central system, the temporary primary node to distribute the subscription messages to the control servers satisfying the preset condition includes:

if the central system is selected as the temporary primary node, then distributing, by the central system, the subscription messages directly to the control servers satisfying a first preset condition; and if one of the control servers is selected as the temporary primary node, then triggering, by the central system, the temporary primary node to distribute the subscription messages directly to the control servers satisfying a second preset condition.

Optionally triggering, by the central system, the temporary primary node to generate the corresponding coordinated control strategy according to the information acquired by the IP-enabled field devices, and the corresponding processing reports, reported by the respective control servers in response to the subscription messages, and transmitting the generated coordinated control strategy respectively to the corresponding control servers includes:

if the central system is selected as the temporary primary node, then receiving, by the central system, the information acquired by the IP-enabled field devices, and the corresponding processing reports, reported by the respective control servers in response to the received subscription messages, generating the corresponding coordinated control strategy based upon the obtained respective information acquired by the IP-enabled field devices, and corresponding processing reports, and transmitting the generated coordinated control strategy respectively to the corresponding control servers; and if one of the control servers is selected as the temporary primary node, then triggering, by the central system, the temporary primary node to receive the information acquired by the IP-enabled field devices, and the corresponding processing reports, reported by the respective control servers in response to the received subscription messages, generating the corresponding coordinated control strategy based upon the obtained respective information acquired by the IP-enabled field devices, and corresponding processing reports, and transmitting the generated coordinated control strategy respectively to the corresponding control servers.

An embodiment of the invention provides an equipment for coordinated control in an intelligent traffic cloud control system including at least a central system, a plurality of control servers, and a plurality of IP-enabled field devices, wherein the central system is connected with the control servers over a network, and the IP-enabled field devices are connected with the control servers over IP address based broadband buses; and the equipment includes:

a processing unit configured to detect the states of respective control servers in a service area, and to select a temporary primary node based upon state detection information; and a triggering unit configured to trigger the temporary primary node to distribute subscription messages to the control servers satisfying a preset condition, to generate a corresponding coordinated control strategy according to information acquired by IP-enabled field devices, and corresponding processing results, reported by the respective control servers in response to the subscription messages, and to transmit the generated coordinated control strategy respectively to the corresponding control servers.

Optionally the processing unit configured to select the temporary primary node based upon the state detection information is configured:

to select the equipment as the temporary primary node upon determining that the size of an area with a traffic jam in the service area reaches a first preset threshold, based upon the obtained state detection information; or to select the equipment as the temporary primary node upon determining that the size of an area with a traffic jam in the service area does not reach a first preset threshold, but the number of control servers in the area with the traffic jam reaches a second preset threshold, based upon the obtained state detection information; or to select one of the control servers in an area with a traffic jam in the service area as the temporary primary node upon determining that the size of the area with the traffic jam does not reach a first preset threshold, and the number of control servers in the area with the traffic jam does not reach a second preset threshold, based upon the obtained state detection information.

Optionally the processing unit is further configured:

to select the equipment as the temporary primary node upon determining that a preset urgent event is occurring.

Optionally the processing unit configured to select one of the control servers in the area with the traffic jam as the temporary primary node is configured:

to calculate the ratio of a state parameter of each control server in the area with the traffic jam to a preset reference state parameter respectively based upon the obtained state detection information, to select one of the calculated respective ratios according to a preset selection criterion, and to determine the control server corresponding to the selected ratio as the temporary primary node.

Optionally the triggering unit configured to trigger the temporary primary node to distribute the subscription messages to the control servers satisfying the preset condition is configured:

if the equipment is selected as the temporary primary node, to distribute the subscription messages directly to the control servers satisfying a first preset condition; and if one of the control servers is selected as the temporary primary node, to trigger the temporary primary node to distribute the subscription messages directly to the control servers satisfying a second preset condition.

Optionally the trigger unit configured to trigger the temporary primary node to generate the corresponding coordinated control strategy according to the information acquired by the IP-enabled field devices, and the corresponding processing reports, reported by the respective control servers in response to the subscription messages, and to transmit the generated coordinated control strategy respectively to the corresponding control servers is configured:

if the equipment is selected as the temporary primary node, to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers; and if one of the control servers is selected as the temporary primary node, to trigger the temporary primary node to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers.

Advantageous effects of the invention are as follows:

In the embodiments of the invention, the central system can perform global coordinated control, or a control server can perform local coordinated control, and if the control server performs local coordinated control, then the control server can distribute the pertinent coordinated control strategy for the particular condition in the service area, thus alleviating the burden on the central system, and reducing the overall amount of data information to be transmitted in the intelligent traffic system, and also shortening the period of time for transmitting the data information so as to improve the efficiency of generating and enforcing the coordinated control strategy, and to address the problem of the traffic jam at the crossing effectively in a real-time manner.

DETAILED DESCRIPTION OF THE EMBODIMENTS

Preferred embodiments of the invention will be described below in further details with reference to the drawings.

Figure 1:
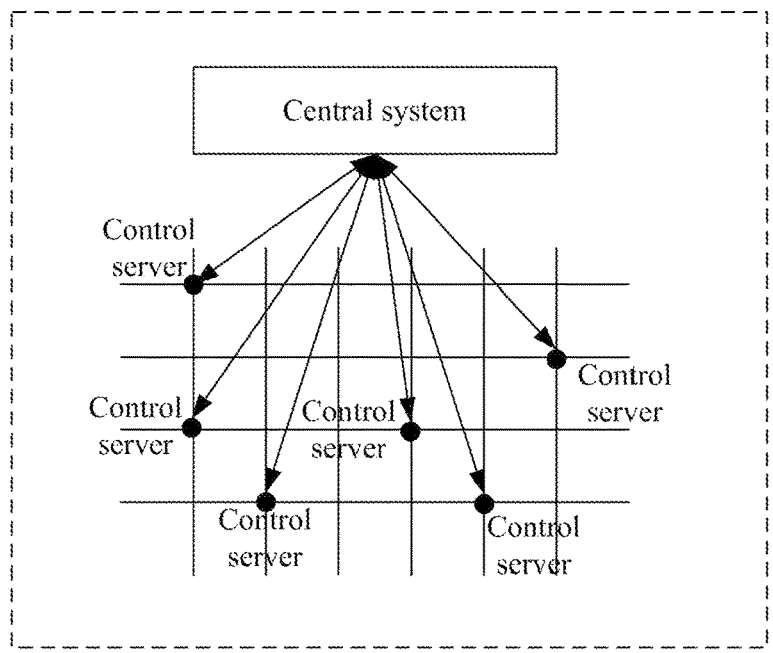
FIG. 1 is a structural diagram of the legend traffic control system.
Figure 2:
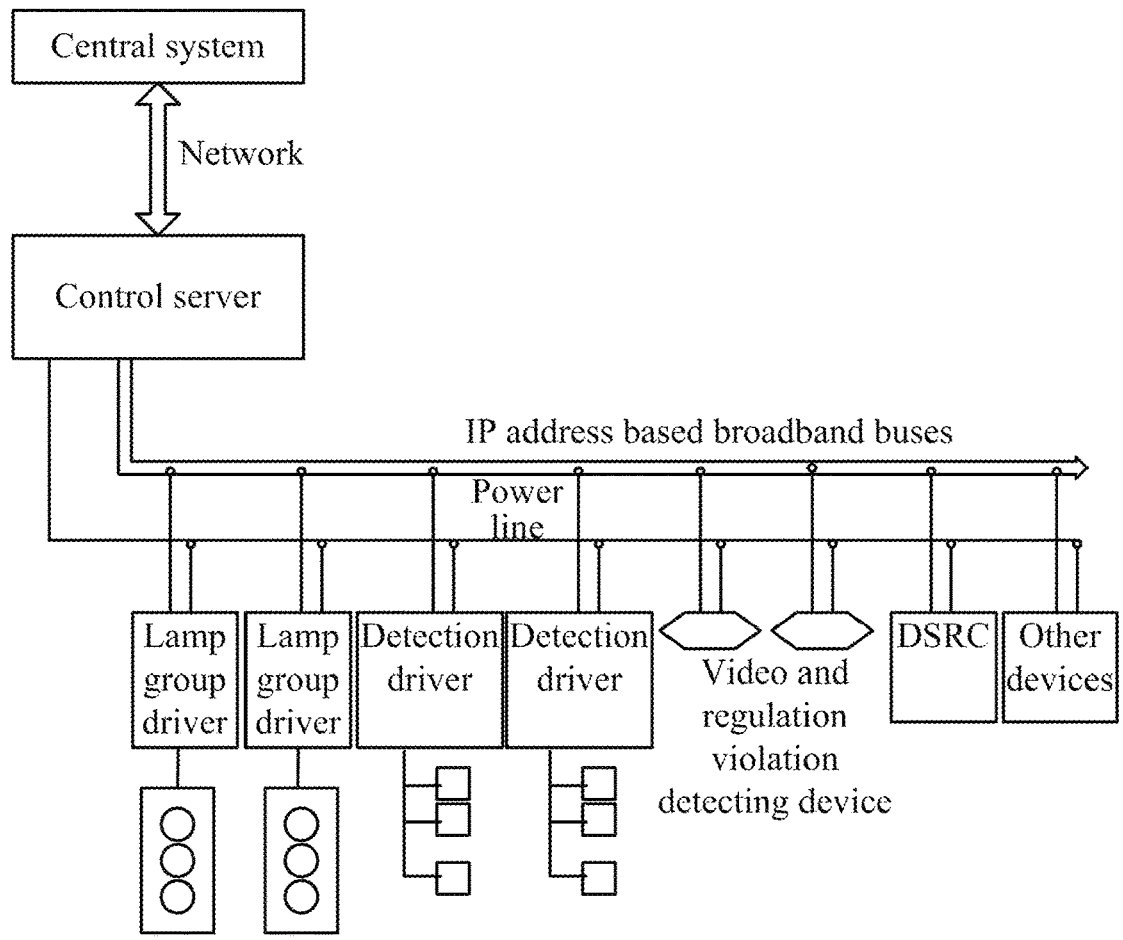
FIG. 2 is a structural diagram of an intelligent traffic cloud control system.

Referring to FIG. 2, an intelligent traffic cloud control system includes at least a central system, a plurality of control servers, and a plurality of IP-enabled field devices, where a general conserver of the intelligent traffic cloud control system is equivalent to the central system, a control server at each crossing is equivalent to one of the control servers, the central system is connected with the control servers over a network, the respective control servers are connected with each other over a network, and the control servers are connected with the IP-enabled field devices over IP address based broadband buses.

Figure 3:
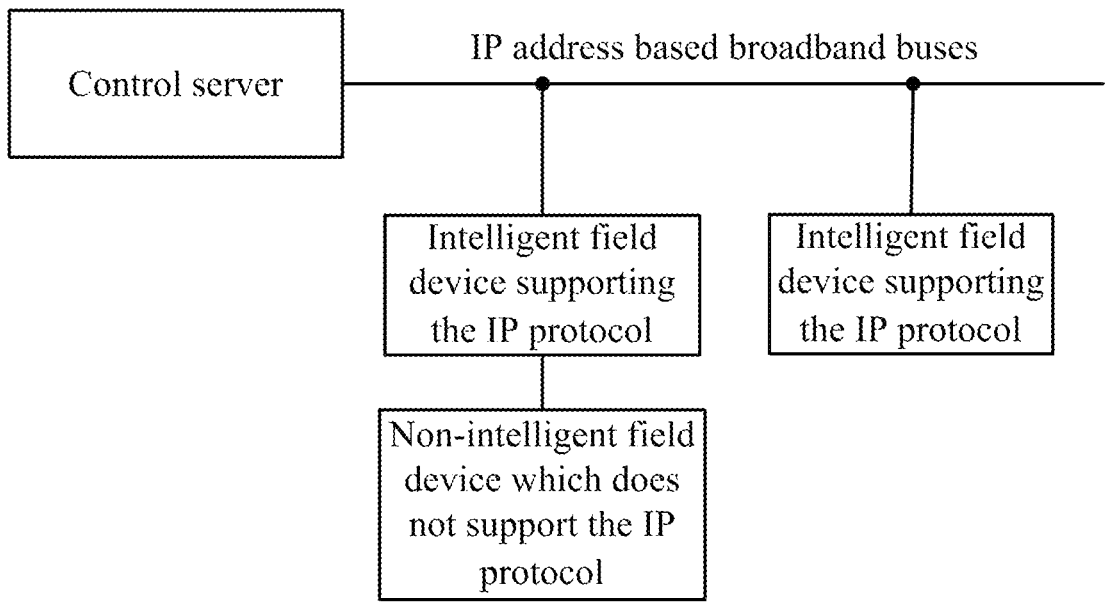
FIG. 3 is a schematic diagram of a control server connected with IP-enabled field devices over IP address based broadband buses.

Referring to FIG. 3, the IP-enabled field devices can be further categorized into intelligent field devices supporting the IP protocol, driver devices supporting the IP protocol, and non-intelligent field devices, which do not support the IP protocol, connected with the driver devices, where the control servers are connected with the intelligent field devices supporting the IP protocol, and the driver devices supporting the IP protocol over IP address based broadband buses.

The IP-enabled field devices refer to devices distributed at respective traffic crossings to acquire data of the traffic crossings, to monitor and control traffic conditions at the crossings, and to perform other functions (e.g., traffic signaling lamps, detecting devices, video and regulation violation detecting devices, etc.), the intelligent field devices supporting the IP protocol refer to IP-enabled field devices which can be connected with the control servers directly over the IP address based broadband buses (e.g., video detection and regulation violation detecting devices, etc.), and the non-intelligent field devices which do not support the IP protocol refer to IP-enabled field devices which shall be connected with the control servers over the IP address based broadband buses through the driver devices supporting the IP protocol (e.g., traffic signaling lamps, detecting devices, etc.).

The control servers can allocate unique IP addresses for the IP-enabled field devices communicating therewith, but also can receive the information acquired by the intelligent field devices supporting the IP protocol, and/or can receive the information, acquired by the non-intelligent field devices which do not support the IP protocol, transmitted by the driver devices supporting the IP protocol, analyze the data of the received information acquired by the IP-enabled field devices, and perform corresponding operations according to a result of analyzing the data.

Firstly the respective control servers in the intelligent traffic cloud control system acquire the real-time information acquired by the IP-enabled field devices at the corresponding crossings.

Then the control servers performs calculations and processing on the real-time information acquired by the IP-enabled field devices, and stores the real-time information acquired by the IP-enabled field devices, and corresponding processing results locally in the control servers, where the corresponding processing results refer to processed data obtained by the respective control servers performing calculations and processing on the collected information acquired by the IP-enabled field devices.

For example, a control server A in the intelligent traffic cloud control system acquires real-time video detection data information at a corresponding crossing through a field video and regulation violation detecting device (e.g., a video camera) (i.e., information, acquired by the IP-enabled field device, obtained through video detection), and stores the acquired real-time video detection data information locally in the control server A; and then the control server performs calculations and processing on the acquired video detection data information in some period of time T, obtains processed data information in the period of time T (e.g., a traffic flow), and stores the processed data information locally in the control server A, where the value of T can be any value taken as needed in reality.

In an embodiment of the invention, a control server can freely perform local coordinated control in a preset range, where the local coordinated control can include traffic regulation enforcement, locus tracking, traffic control, positioning of an object to be positioned, etc.

Particularly the control server can centrally process the data acquired by the IP-enabled field devices, and the corresponding processing result, and control the traffic in its service area through edge computing, or can do so in a pre-created customized area including the control server when a preset trigger condition is satisfied.

Furthermore when the preset trigger condition is satisfied, if the control server is a master control server (i.e., a first control server), then the master control server will generate a coordinated control strategy through self-learning and edge computing to perform coordinated control in the customized area; and if the control server is a slave control server (i.e., another control server), then the slave control server will retrieve the coordinated control strategy from the master control server through cloud computing, where the customized area includes the service area of the control server, and a service area of another specified control server than the control server.

Figure 4:
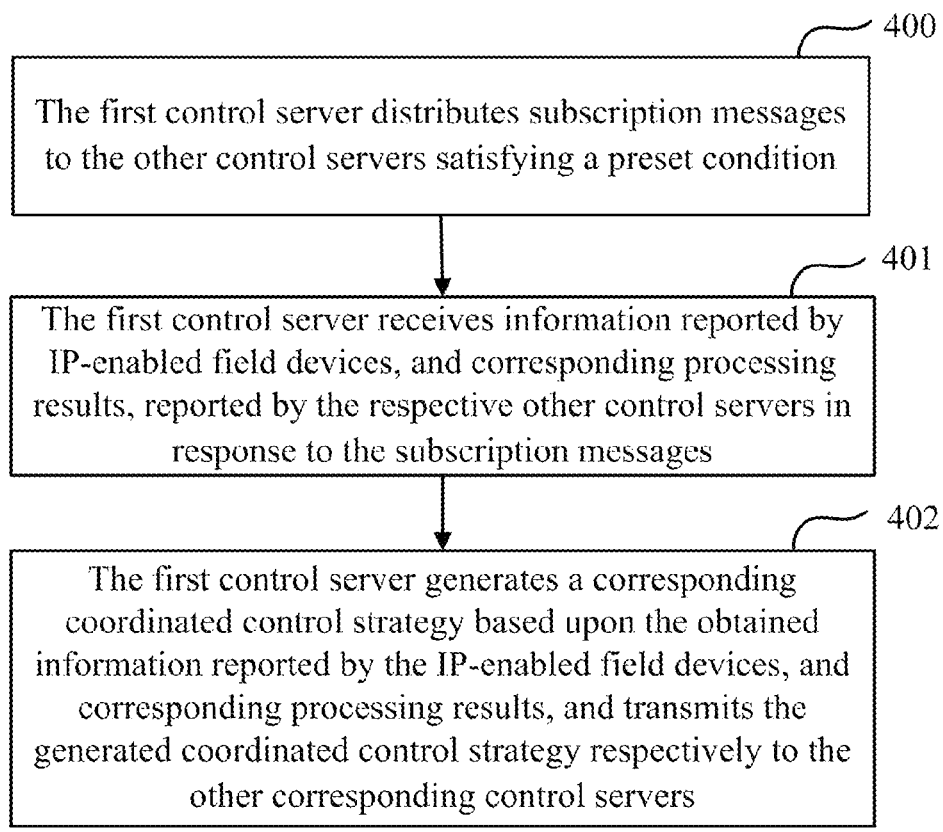
FIG. 4 is a detailed flow chart of a first method for coordinated control in an intelligent traffic cloud control system according to an embodiment of the invention.

FIG. 4 illustrates a particular flow thereof.

In the step 400, the first control server distributes subscription messages to the other control servers satisfying a preset condition.

In an embodiment, all the control servers can be first control servers, and the following description will be made by referring each of them to the first control server for the sake of a convenient description.

Optionally in the step 400, the first control server will distribute the subscription messages to the other control servers satisfying the preset condition only upon determining that a preset trigger condition is satisfied, where the preset trigger condition includes but will not be limited to the following trigger conditions:

A first trigger condition is that the first control server has not received any instruction issued by the central system in a preset length of time for waiting for the instruction after reporting state detection information to the central system.

Particularly the first control server detecting the state in a real-time manner will report on its own imitative the state detection information to the central system, and if the first control server detects a surrounding traffic jam, or a traffic accident occurring in the service area, and has not received any instruction issued by the central system in the preset length of time for waiting for the instruction, then the first control server will freely perform local coordinated control in the preset range after the preset length of time for waiting for the instruction elapses.

Here the first control server may have not received any instruction issued by the central system in the following two scenarios without any limitation thereto:

In a first scenario, the first control server has not received any coordinated control strategy issued by the central system.

In a second scenario, the first control server has not received any instruction issued by the central system to instruct the first control server to generate a coordinated control strategy.

For example, given a control server 1, a control server 2, a control server 3, and the central system in some area, if the control server 2 is a first control server, there is a preset length of time for waiting for an instruction is two minutes, and the control server 2 detecting in a real-time manner will report state detection information to the central system on its own initiative, then if the control server 2 detects a traffic accident occurring in a service area, and the control server 2 has not received any instruction issued by the central system in two minutes, then the control server 2 will freely perform local coordinated control in a preset range.

A second trigger condition is that the first control server determines that a specified event is occurring, according to the collected state detection information and/or information acquired by the IP-enabled field devices.

Particularly the first control server detecting the state in a real-time manner can determine that a specified event is occurring, according to the collected state detection information and/or information acquired by the IP-enabled field devices, where the specified event can be an urgent event, e.g., "A traffic accident occurring in the service area", "An ambulance passing in the service area", "A serious traffic jam occurring in the service area", "A VIP traveling in the service area", etc., and if the first control server detects the specified event occurring in the service area, then it will freely perform local coordinated control in the preset range without waiting for any instruction issued by the central system.

Furthermore if the first control server determines that the preset trigger condition is satisfied, then it will distribute the subscription messages to the other control servers satisfying the preset condition.

Particularly the other control servers satisfying the preset condition can refer to the other control servers in a specified range around the first control server, that is, the preset condition is preset as the "specified range around the first control server".

For example, the specified range around the first control server can be preset as "being adjacent to the first control server", that is, local coordinated control can be performed among the other control servers adjacent to the first control server.

In another example, the specified range around the first control server can be preset as a "range with a center thereof being the first control server, and a radius being N meters, where N is a preset parameter", that is, local coordinated control can be performed among the other control servers in some range around the first control server.

In this way, the first control server can configure flexibly the management and control range for coordinated control to thereby freely perform coordinated control in any area.

In the step 401, the first control server receives information reported by IP-enabled field devices, and corresponding processing results, reported by the respective other control servers in response to the subscription messages.

The respective other control servers report the information reported by the IP-enabled field devices, and the corresponding processing results to the first control server in response to the subscription messages issued by the first control server upon reception of the subscription messages.

In the step 402, the first control server generates a corresponding coordinated control strategy based upon the obtained information reported by the IP-enabled field devices, and corresponding processing results, and transmits the generated coordinated control strategy respectively to the other corresponding control servers.

The first control server generates the corresponding coordinated control strategy based upon the information reported by the IP-enabled field devices, and the corresponding processing results upon reception of the information reported by the IP-enabled field devices, and the corresponding processing results from the other control servers in the specified range around the first control server, where the coordinated control strategy can include but will not be limited to the following two types:

A first type is a general coordinated control strategy.

Particularly the general coordinated control strategy includes all the coordinated control strategies generated by the first control sever for the other control servers in the specified range around the first control server, where the first control server transmits the general coordinated control strategy to the other control servers in the specified range around the first control server, so that the respective other control servers can obtain their desirable coordinated control strategies as needed for them.

A second type is a pertinent coordinated control strategy.

The pertinent coordinated control strategy is a corresponding coordinated control strategy generated by the first control serve directly for a particular condition of each of the other control servers in the specified range around the first control server, where the respective other control servers obtaining the coordinated control strategies issued by the first control server can enforce them directly without further obtaining them as needed.

Figure 5:
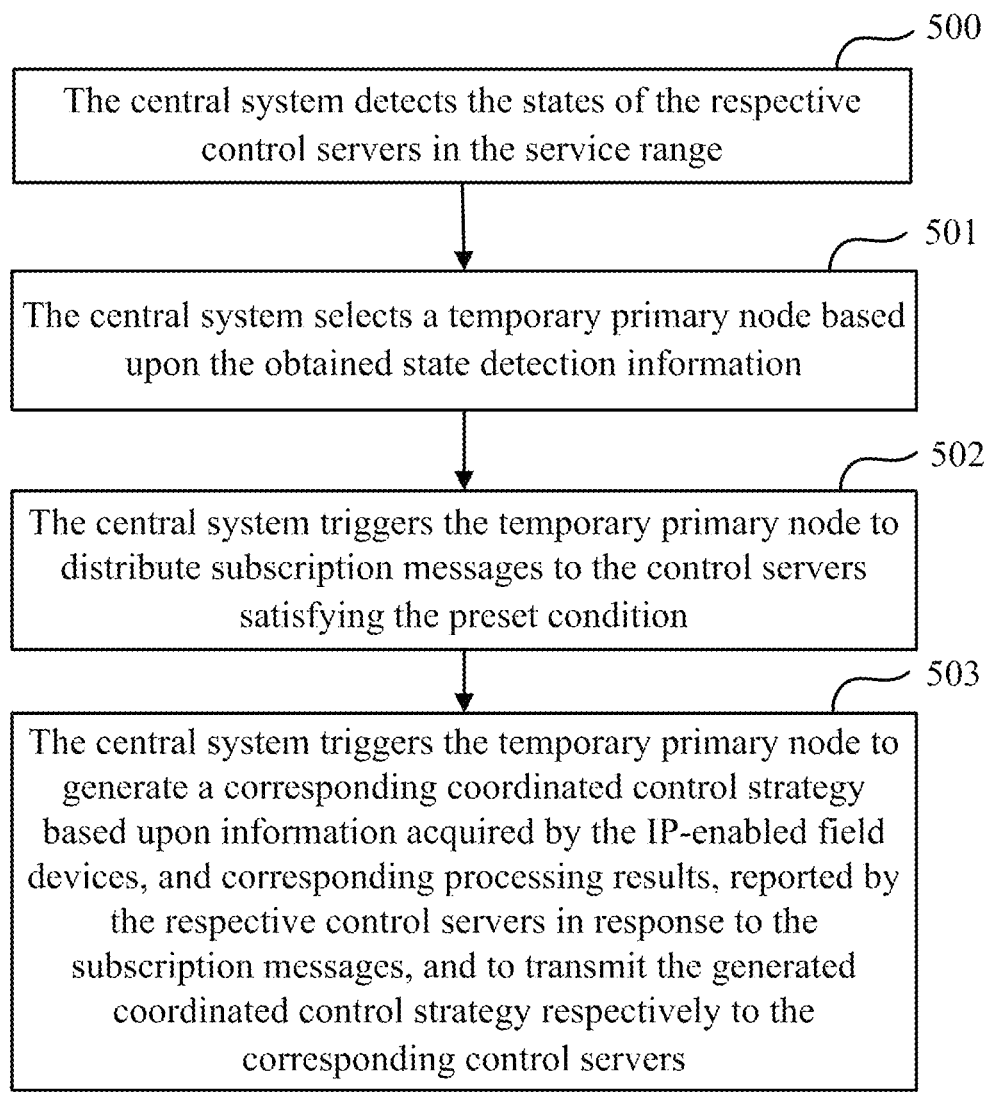
FIG. 5 is a detailed flow chart of a second method for coordinated control in an intelligent traffic cloud control system according to an embodiment of the invention.

Referring to FIG. 5, in an embodiment of the invention, the central system can also perform coordinated control in the service area, where the coordinated control can include traffic regulation enforcement, locus tracking, traffic control, positioning of an object to be positioned, etc.

Particularly the central system exchanges data with the control servers over the network, shares the data stored in the control servers connected therewith, analyzes and processes the shared data, obtains a result of analyzing, generates a coordinated control strategy according to the result of analyzing, and transmits the coordinated control strategy to the corresponding control servers, where the central system exchanges the data with the control servers over the network by receiving state data of the control servers in a real-time manner, receiving statistic and inquiry data of the control servers in a non-real-time manner, and subscribing as needed to the data stored in the control servers.

The control servers retrieve the coordinated control strategy from the central system through cloud computing, and perform corresponding operations according to the coordinated control strategy.

A particular flow thereof is as follows:

In the step 500, the central system detects the states of the respective control servers in the service range.

Particularly the central system in the intelligent traffic cloud control system detects the states of the respective control servers in the service range in a real-time manner, that is, the respective control servers acquire the information through the IP-enabled field devices in a real-time manner, evaluate traffic states in their service areas based upon the obtained information acquired by the IP-enabled field devices, and corresponding processing results, and report evaluation results to the central system on their own initiatives, where the evaluation results are the state detection information.

For example, if the respective control servers detect the states of "vehicle flows" and "vehicle speeds" in the service areas in a real-time manner, then the respective control servers will compare the obtained information acquired by the IP-enabled field devices with a preset reference "vehicle flow" and "vehicle speed", evaluate "traffic jam states" at the crossings in the service areas, and report the evaluation results to the central system on their own initiative, where the "traffic jam states" can be represented as three parameters of "Smooth", "Busy", and "Jam".

In the step 501, the central system selects a temporary primary node based upon the obtained state detection information.

Particularly after the respective control servers return the state detection information to the central systems, the central system selects the temporary primary node based upon the parameters of the obtained state detection information, and if the central system detects the states of "traffic jam states" at the crossings in the service areas of the respective control servers, where the "traffic jam states" are represented as three parameters of "Smooth", "Busy", and "Jam", then the central system evaluating the parameters of "Jam" of the respective control servers will determine the "size of the area with the traffic jam", and the "number of control servers in the area with the traffic jam" in the service area respectively as first and second evaluation criterions.

Particularly there are the following three scenarios without any limitation thereto:

In a first scenario, the central system selects the central system as the temporary primary node upon determining that the "size of the area with the traffic jam" in the service area reaches a first preset threshold, based upon the obtained state detection information.

In the first scenario, the central system obtains the state detection information, and then determines the "size of the area with the traffic jam" as the first evaluation criterion, and selects the central system as the temporary primary node upon determining that the "size of the area with the traffic jam" in the service area reaches the first preset threshold.

For example, if the "size of the area with the traffic jam" in the state detection information obtained by the central system to the total size of the service area is 80%, then the size of the area with the traffic jam will be so large that a single control server can not regulate the traffic state effectively, so the central system shall adjust it globally, and thus will be selected as the temporary primary node.

In a second scenario, the central system selects the central system as the temporary primary node upon determining that the "size of the area with the traffic jam" in the service area does not reach a first preset threshold, but the "number of control servers in the area with the traffic jam" reaches a second preset threshold, based upon the obtained state detection information.

In the second scenario, the central system obtains the state detection information, and then determines the "size of the area with the traffic jam" as the first evaluation criterion, and determines that the "size of the area with the traffic jam" in the service area does not reach the first preset threshold; and the central system further determines the "number of control servers in the area with the traffic jam" as the second evaluation criterion, and selects the central system as the temporary primary node upon determining that the "number of control servers in the area with the traffic jam" reaches the second preset threshold.

For example, if the "size of the area with the traffic jam" in the state detection information obtained by the central system to the total size of the service area is 20%, and it is determined that the "size of the area with the traffic jam" in the service area does not reach the first preset threshold, then the "number of control servers in the area with the traffic jam" will be determined as the second evaluation criterion; and if the "number of control servers in the area with the traffic jam" in the state detection information obtained by the central system to the total number of control servers in the service area is 75%, then although there is a small size of the area with the traffic jam, the number of control servers in the area with the traffic jam will be so large that a single control server can not regulate the traffic state effectively, so the central system shall adjust it globally, and thus will be selected as the temporary primary node.

In a third scenario, the central system selects one of the control servers in the area with the traffic jam as the temporary primary node upon determining that the "size of the area with the traffic jam" in the service area does not reach a first preset threshold, and the "number of control servers in the area with the traffic jam" does reach a second preset threshold, based upon the obtained state detection information.

In the third scenario, the central system obtains the state detection information, and then determines the "size of the area with the traffic jam" as the first evaluation criterion, and determines that the "size of the area with the traffic jam" in the service area does not reach the first preset threshold; and the central system further determines the "number of control servers in the area with the traffic jam" as the second evaluation criterion, and selects one of the control servers in the area with the traffic jam as the temporary primary node upon determining that the "number of control servers in the area with the traffic jam" does not reach the second preset threshold.

For example, if the "size of the area with the traffic jam" in the state detection information obtained by the central system to the total size of the service area is 20%, and it is determined that the "size of the area with the traffic jam" in the service area does not reach the first preset threshold, then the "number of control servers in the area with the traffic jam" will be determined as the second evaluation criterion; and if the "number of control servers in the area with the traffic jam" in the state detection information obtained by the central system to the total number of control servers in the service area is 15%, then it will be determined that the "number of control servers in the area with the traffic jam" in the service area does not reach the second preset threshold, that is, neither the "size of the area with the traffic jam nor the "number of control servers in the area with the traffic jam" satisfies the respective preset threshold, so the central system will select one of the control servers in the area with the traffic jam as the temporary primary node instead of adjusting the traffic globally.

If the third scenario is satisfied, that is, the central systems selects one of the control servers in the area with the traffic jam as the temporary primary node More particularly the central system calculates the ratio of a state parameter of each control server in the area with the traffic jam to a preset reference state parameter respectively based upon the obtained state detection information, selects one of the calculated respective ratios according to a preset selection criterion, and determines the control server corresponding to the selected ratio as the temporary primary node.

For example, the central system obtains the state detection information, and then calculates the ratio of a state parameter of each control server in the area with the traffic jam to a preset reference state parameter respectively, where the state parameter corresponding to the ratio is a "vehicle speed", that is, the central system calculates the ratio of the "vehicle speed" of each control server in the area with the traffic jam to a preset "reference vehicle speed" respectively based upon the obtained state detection information, and selects the smallest one of the calculated ratios, and since a smaller ratio of the "vehicle speed" to the preset "reference vehicle speed" indicates a more serious traffic jam in a service area of the control server corresponding to the ratio, the central system determines the control server corresponding to the smallest ratio as the temporary primary node.

In another example, the central system obtains the state detection information, and then calculates the ratio of a state parameter of each control server in the area with the traffic jam to a preset reference state parameter respectively, where the state parameter corresponding to the ratio is a "vehicle denseness", that is, the central system calculates the ratio of the "vehicle denseness" of each control server in the area with the traffic jam to a preset "vehicle denseness" respectively based upon the obtained state detection information, and selects the largest one of the calculated ratios, and since a larger ratio of the "vehicle denseness" to the preset "vehicle denseness" indicates a more serious traffic jam in a service area of the control server corresponding to the ratio, the central system determines the control server corresponding to the largest ratio as the temporary primary node.

Furthermore the central system can select the central system directly as the temporary primary node upon determining a preset urgent event occurring. For example, if the central system is notified by an administrator, and determines there is an urgent event occurring in its service area, e.g., "control deployment for arresting", "an ambulance passing", or another urgent event, then a single control server can not handle it, so the central system shall adjust it globally, and thus will be selected as the temporary primary node.

For example, if the central system is notified by the administrator that there is an ambulance passing in the service area over a road segment with a traffic jam, then the central system will select itself as the temporary primary node, and adjust the traffic to thereby ensure timely arrival of the ambulance at a destination.

In another example, the central system receives a "Control deployment for arresting" command issued by the administrator, where "Control deployment for arresting" can further include "Search for a suspicious vehicle involved in a case", "Search for a vehicle with a falsified license plate", etc.

Particularly if the central system receives "Search for a suspicious vehicle involved in a case" in the "Control deployment for arresting" command issued by the administrator, then the central system will select itself as the temporary primary node, and distribute subscription messages to the respective control servers in the service area, where the subscription messages can include "the picture of a license plate number of the vehicle", "the name of a road on which the vehicle is traveling", "the particular time when the vehicle passes", "the image of the face of a driver of the vehicle", etc., and the respective control servers will return the corresponding information acquired by the IP-enabled field devices to the central system in response to the obtained subscription messages to thereby ensure timely resolving of the urgent event of "Search for a suspicious vehicle involved in a case".

In still another example, if the central system receives "Search for a vehicle with a falsified license plate" in the "Control deployment for arresting" command issued by the administrator, then the central system will select itself as the temporary primary node, and distribute subscription messages to the respective control servers in the service area, where the subscription messages can include "the picture of a license plate number of the vehicle", "the name of a road on which the vehicle is traveling", "the particular time when the vehicle passes", etc., and if the central system determines that there are vehicles with the same license plate number occurring on at least two road segments at the same time, according to the information acquired by the IP-enabled field devices reported by the respective control servers, then the central server will determine that a vehicle with a falsified license plate is detected, to thereby ensure timely resolving of the urgent event of "Search for a vehicle with a falsified license plate".

In the step 502, the central system triggers the temporary primary node to distribute subscription messages to the control servers satisfying the preset condition.

If the central system is selected as the temporary primary node, then the central system will distribute the subscription messages directly to the control servers satisfying a first preset condition.

For example, if the central system is selected as the temporary primary node, then the central system will distribute the subscription messages directly to the control servers satisfying the first preset condition, where the first preset condition can be control servers in the area with the traffic jam, or control servers in the area with the traffic jam, and a crowded area, and the subscription messages transmitted by the central system to the control servers satisfying the first preset condition can include geographical positions, surrounding traffic conditions, node types, etc., of the control servers.

If one of the control servers is selected as the temporary primary node, then the central system will trigger the temporary primary node to distribute the subscription messages to the control servers satisfying a second preset condition, that is, the central system will notify the control server that it has been selected as the temporary primary node, and instruct the temporary primary node to distribute the subscription messages to the control servers satisfying the second preset condition.

For example, if one of the control servers is selected as the temporary primary node, then the central system will trigger the temporary primary node to distribute the subscription messages to the control servers satisfying the second preset condition, where the second preset condition can be control servers adjacent to the temporary primary node, or the second preset condition can be control servers in the area with the traffic jam, or control servers in the area with the traffic jam, and a crowded area, and the subscription messages transmitted by the temporary primary node to the control servers satisfying the second preset condition can include geographical positions, surrounding traffic conditions, node types, etc., of the control servers.

Here the contents of the subscription messages can be determined by the processing capacity of the temporary primary node, and if there is a sufficiently high processing capacity of the temporary primary node, then the contents of the subscription messages can be the same as the contents of the subscription messages distributed by the central node which is the temporary primary node; and if there is a low processing capacity of the temporary primary node, then the contents of the subscription messages can include necessary contents as long as the current traffic can be regulated effectively according to the necessary contents.

Alternatively the central system can distribute the subscription messages to the control server before selecting the temporary primary node, where the subscription messages can be rough subscription messages, e.g., "a vehicle flow", "a passerby flow", etc., or after the central system selects the temporary primary node, the temporary primary node can distribute the subscription messages to the control servers, where the subscription messages can be pertinent subscription messages, particularly in the following two scenarios:

In a first scenario, if the central system is selected as the temporary primary node, then the central system will distribute the pertinent subscription messages to the respective control servers, where the pertinent subscription messages can particularly include "a vehicle flow" and "a passerby flow", and can further include "the name of a road segment with a traffic jam", "the number of traffic lamps on the road with the traffic jam, and an interval of time at which they are switched", and other particular information; and In a second scenario, if one of the control servers is selected as the temporary primary node, then the central system will trigger the temporary primary node to distribute the pertinent subscription messages to the control servers in the service area, or the control servers adjacent thereto, where the pertinent subscription messages can particularly include "a vehicle flow" and "a passerby flow", and can further include "the name of a road segment with a traffic jam", "the number of failing cameras", "the number of traffic lamps on the road with the traffic jam, and an interval of time at which they are switched", and other particular information.

In the step 503, the central system triggers the temporary primary node to generate a corresponding coordinated control strategy based upon information acquired by the IP-enabled field devices, and corresponding processing results, reported by the respective control servers in response to the subscription messages, and to transmit the generated coordinated control strategy respectively to the corresponding control servers.

The central system triggers the temporary primary node to generate the corresponding coordinated control strategy based upon the information acquired by the IP-enabled field devices, and the corresponding processing results, reported by the respective control servers in response to the subscription messages, and to transmit the generated coordinated control strategy respectively to the corresponding control servers.

Particularly the coordinated control strategy can include but will not be limited to the following two types:

A first type is a general coordinated control strategy.

Particularly the general coordinated control strategy includes all the coordinated control strategies generated by the temporary primary node for the respective control servers, where the temporary primary node transmits the general coordinated control strategy to the respective control servers, so that the respective control servers can obtain their desirable coordinated control strategies as needed for them.

A second type is a pertinent coordinated control strategy.

The pertinent coordinated control strategy is a corresponding coordinated control strategy generated by the temporary primary node directly for a particular condition of each control server, where the respective other control servers obtaining the coordinated control strategies issued by the temporary primary node can enforce them directly without further obtaining them as needed.

If the central system is selected as the temporary primary node, then the central system will receive the information acquired by the IP-enabled field devices, reported by the respective control servers in response to the received subscription messages, generate corresponding coordinated control strategies based upon the obtained respective information acquired by the IP-enabled field devices, and transmit the generated respective coordinated control strategies respectively to the corresponding control servers.

For example, if the central system is selected as the temporary primary node, then the central system will distribute the subscription messages directly to the control servers satisfying the first preset condition, and generate the corresponding coordinated control strategies based upon the received information acquired by the IP-enabled field devices, returned by the respective control servers in response to the subscription messages. For example, if the central system determines from the received information acquired by the IP-enabled field devices, returned by the respective control servers in response to the subscription messages that there are the most serious traffic jams of vehicles traveling in the service areas of the control server 1 and the control server 8 in the area with the traffic jam, then the central system will generate such corresponding coordinated control strategies based upon the information acquired by the IP-enabled field devices that a period of time for which a signaling lamp is being switched into blue in the traffic jam direction of the control server 1 is lengthened as appropriate, and a period of time for which a signaling lamp is being switched into red in the traffic jam direction of the control server 8 is shortened as appropriate, and transmit the coordinated control strategies respectively to the control server 1 and the control server 8 to thereby address the problem of the traffic jam in the area with the traffic jam as soon as possible.

If one of the control servers is selected as the temporary primary node, then the central system will trigger the temporary primary node to receive the information acquired by the IP-enabled field devices, reported by the respective control servers in response to the received subscription messages, to generate corresponding coordinated control strategies based upon the obtained respective information acquired by the IP-enabled field devices, and to transmit the generated respective coordinated control strategies respectively to the corresponding control servers.

For example, if one of the control servers is selected as the temporary primary node, then the central system will trigger the temporary primary node to receive the information acquired by the IP-enabled field devices, reported by the respective control servers in response to the received subscription messages, and to generate the corresponding coordinated control strategies based upon the obtained respective information acquired by the IP-enabled field devices. For example, if the central system instructs the temporary primary node to determine from the received information acquired by the IP-enabled field devices, reported by the respective control servers in response to the subscription messages that there is the most serious traffic jam northward from a crossing of the temporary primary node, then the temporary primary node will generate such a corresponding coordinated control strategy based upon the information acquired by the IP-enabled field devices that a period of time for which a signaling lamp of the temporary primary node is being switched into blue in the northward direction is lengthened as appropriate, and a period of time for which a green lamp at a crossing corresponding to a control server adjacent northward to the temporary primary node is being switched on is lengthened as appropriate, and transmit the coordinate control strategy respectively to the control server adjacent northward to the temporary primary node, and the temporary primary node to thereby address the problem of the traffic jam in the area with the traffic jam as soon as possible.

Figure 6:
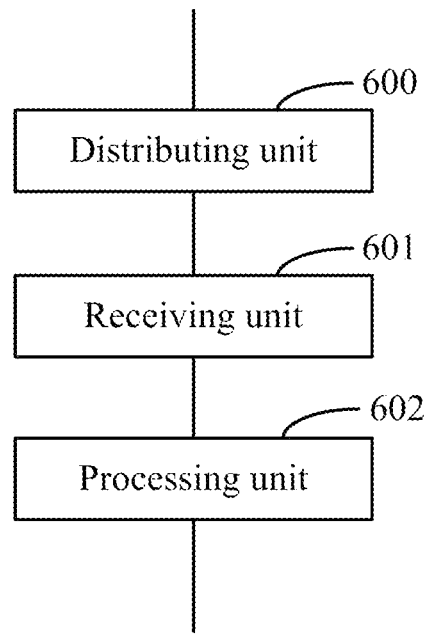
FIG. 6 is a schematic functional structural diagram of a central system.

Referring to FIG. 6, in an embodiment of the invention, a coordinated control equipment (e.g., a control server) includes at least a distributing unit 600, a receiving unit 601, and a triggering unit 602, where:

The distributing unit 600 is configured to distribute subscription messages to the other control servers satisfying a preset condition.

The receiving unit 601 is configured to receive information acquired by the IP-enabled field devices, and corresponding processing results, reported by the respective other control servers in response to the subscription messages.

The triggering unit 602 is configured to generate a corresponding coordinated control strategy based upon the obtained information reported by the IP-enabled field devices, and corresponding processing results, and to transmit the generated coordinated control strategy respectively to the other corresponding control servers.

Optionally the distributing unit 600 configured to distribute the subscription messages to the other control servers satisfying the preset condition is configured:

To distribute the subscription messages to the other control servers satisfying the preset condition upon determining that a preset trigger condition is satisfied;

Where the preset trigger condition includes:

That it is determined that a specified event is occurring, according to collected state detection information and/or the information acquired by the IP-enabled field devices.

Optionally the distributing unit 600 configured to distribute the subscription messages to the other control servers satisfying the preset condition is configured:

To distribute the subscription messages to the other control servers in a specified range surrounding the equipment.

Figure 7:
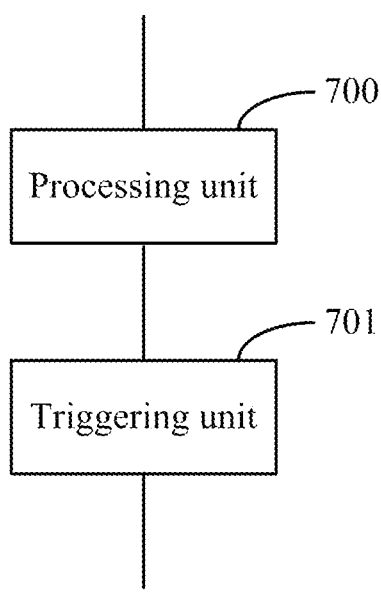
FIG. 7 is a schematic functional structural diagram of a control server.

Referring to FIG. 7, in an embodiment of the invention, a coordinated control equipment (e.g., a central system) includes at least a processing unit 700 and a triggering unit 701, where:

The processing unit 700 is configured to detect the states of respective control servers in a service area, and to select a temporary primary node based upon state detection information; and A triggering unit 701 is configured to trigger the temporary primary node to distribute subscription messages to the control servers satisfying a preset condition, to generate a corresponding coordinated control strategy according to information acquired by the IP-enabled field devices, and corresponding processing results, reported by the respective control servers in response to the subscription messages, and to transmit the generated coordinated control strategy respectively to the corresponding control servers.

Optionally the processing unit 700 configured to select the temporary primary node based upon the state detection information is configured:

To select the equipment as the temporary primary node upon determining that the size of an area with a traffic jam in the service area reaches a first preset threshold, based upon the obtained state detection information; or To select the equipment as the temporary primary node upon determining that the size of an area with a traffic jam in the service area does not reach a first preset threshold, but the number of control servers in the area with the traffic jam reaches a second preset threshold, based upon the obtained state detection information; or To select one of the control servers in an area with a traffic jam in the service area as the temporary primary node upon determining that the size of the area with the traffic jam does not reach a first preset threshold, and the number of control servers in the area with the traffic jam does not reach a second preset threshold, based upon the obtained state detection information.

Optionally the processing unit 700 is further configured:

To select the equipment as the temporary primary node upon determining that a preset urgent event is occurring.

Optionally the processing unit 700 configured to select one of the control servers in the area with the traffic jam as the temporary primary node is configured:

To calculate the ratio of a state parameter of each control server in the area with the traffic jam to a preset reference state parameter respectively based upon the obtained state detection information, to select one of the calculated respective ratios according to a preset selection criterion, and to determine the control server corresponding to the selected ratio as the temporary primary node.

Optionally the triggering unit 701 configured to trigger the temporary primary node to distribute the subscription messages to the control servers satisfying the preset condition is configured:

If the equipment is selected as the temporary primary node, to distribute the subscription messages directly to the control servers satisfying a first preset condition; and If one of the control servers is selected as the temporary primary node, to trigger the temporary primary node to distribute the subscription messages directly to the control servers satisfying a second preset condition.

Optionally the trigger unit 701 configured to trigger the temporary primary node to generate the corresponding coordinated control strategy according to the information acquired by the IP-enabled field devices, and the corresponding processing reports, reported by the respective control servers in response to the subscription messages, and to transmit the generated coordinated control strategy respectively to the corresponding control servers is configured:

If the equipment is selected as the temporary primary node, to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers; and If one of the control servers is selected as the temporary primary node, to trigger the temporary primary node to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers.

In summary, in the embodiments of the invention, the central system can perform global coordinated control, or a control server can perform local coordinated control, and if the control server performs local coordinated control, then the control server can distribute the pertinent coordinated control strategy for the particular condition in the service area, thus alleviating the burden on the central system, and reducing the overall amount of data information to be transmitted in the intelligent traffic system, and also shortening the period of time for transmitting the data information so as to improve the efficiency of generating and enforcing the coordinated control strategy, and to address the problem of the traffic jam at the crossing effectively in a real-time manner.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for coordinated control in an intelligent traffic cloud control system comprising at least a central system, a plurality of control servers, and a plurality of IP-enabled field devices, wherein the central system is connected with the control servers over a network, and the IP-enabled field devices are connected with the control servers over IP address based broadband buses; and the method comprises:
   detecting, by the central system, the states of respective control servers in a service area, and selecting a temporary primary node based upon state detection information; and
   triggering, by the central system, the temporary primary node to distribute subscription messages to the control servers satisfying a preset condition, to generate a corresponding coordinated control strategy according to information acquired by the IP-enabled field devices, and corresponding processing results, reported by the respective control servers in response to the subscription messages, and to transmit the generated coordinated control strategy respectively to the corresponding control servers,
   wherein the coordinated control strategy is configured to control time for signaling lamps at crossings in service areas of the respective control servers;
   wherein detecting, by the central system, the states of respective control servers in the service area comprises:
      detecting, by the central system, states of traffic jam states at the crossings in service areas of the respective control servers;
   wherein selecting, by the central system, the temporary primary node based upon the state detection information comprises:
      selecting, by the central system, the central system as the temporary primary node upon determining that the size of an area with a traffic jam in the service area reaches a first preset threshold, based upon the obtained state detection information; or
      selecting, by the central system, the central system as the temporary primary node upon determining that the size of an area with a traffic jam in the service area does not reach a first preset threshold, and the number of control servers in the area with the traffic jam reaches a second preset threshold, based upon the obtained state detection information; or
      selecting, by the central system, one of the control servers in an area with a traffic jam in the service area as the temporary primary node upon determining that the size of the area with the traffic jam does not reach a first preset threshold, and the number of control servers in the area with the traffic jam does not reach a second preset threshold, based upon the obtained state detection information.

2. The method according to claim 1, wherein the method further comprises:
   selecting, by the central system, the central system as the temporary primary node upon determining that a preset urgent event is occurring.

3. The method according to claim 1, wherein selecting, by the central system, one of the control servers in the area with the traffic jam as the temporary primary node comprises:
   calculating, by the central system, the ratio of a state parameter of each control server in the area with the traffic jam to a preset reference state parameter respectively based upon the obtained state detection information, selecting one of the calculated respective ratios according to a preset selection criterion, and determining the control server corresponding to the selected ratio as the temporary primary node.

4. The method according to claim 1, wherein triggering, by the central system, the temporary primary node to distribute the subscription messages to the control servers satisfying the preset condition comprises:
   if the central system is selected as the temporary primary node, then distributing, by the central system, the subscription messages directly to the control servers satisfying a first preset condition; and
   if one of the control servers is selected as the temporary primary node, then triggering, by the central system, the temporary primary node to distribute the subscription messages directly to the control servers satisfying a second preset condition.

5. The method according to claim 1, wherein triggering, by the central system, the temporary primary node to generate the corresponding coordinated control strategy according to the information acquired by the IP-enabled field devices, and the corresponding processing reports, reported by the respective control servers in response to the subscription messages, and transmitting the generated coordinated control strategy respectively to the corresponding control servers comprises:

if the central system is selected as the temporary primary node, then receiving, by the central system, the information acquired by the IP-enabled field devices, and the corresponding processing reports, reported by the respective control servers in response to the received subscription messages, generating the corresponding coordinated control strategy based upon the obtained respective information acquired by the IP-enabled field devices, and corresponding processing reports, and transmitting the generated coordinated control strategy respectively to the corresponding control servers; and if one of the control servers is selected as the temporary primary node, then triggering, by the central system, the temporary primary node to receive the information acquired by the IP-enabled field devices, and the corresponding processing reports, reported by the respective control servers in response to the received subscription messages, generating the corresponding coordinated control strategy based upon the obtained respective information acquired by the IP-enabled field devices, and corresponding processing reports, and transmitting the generated coordinated control strategy respectively to the corresponding control servers.

6. An equipment for coordinated control in an intelligent traffic cloud control system comprising at least a central system, a plurality of control servers, and a plurality of IP-enabled field devices, wherein the central system is connected with the control servers over a network, and the IP-enabled field devices are connected with the control servers over IP address based broadband buses; and the equipment is the central system, and the equipment comprises:

a processing unit configured to detect the states of respective control servers in a service area, and to select a temporary primary node based upon state detection information; and a triggering unit configured to trigger the temporary primary node to distribute subscription messages to the control servers satisfying a preset condition, to generate a corresponding coordinated control strategy according to information acquired by IP-enabled field devices, and corresponding processing results, reported by the respective control servers in response to the subscription messages, and to transmit the generated coordinated control strategy respectively to the corresponding control servers, wherein the coordinated control strategy is configured to control time for signaling lamps at crossings in service areas of the respective control servers;

wherein the processing unit configured to detect the states of respective control servers in the service area is further configured:

to detect states of traffic jam states at the crossings in service areas of the respective control servers;

wherein the processing unit configured to select the temporary primary node based upon the state detection information is further configured:

to select the equipment as the temporary primary node upon determining that the size of an area with a traffic jam in the service area reaches a first preset threshold, based upon the obtained state detection information; or to select the equipment as the temporary primary node upon determining that the size of an area with a traffic jam in the service area does not reach a first preset threshold, but the number of control servers in the area with the traffic jam reaches a second preset threshold, based upon the obtained state detection information; or to select one of the control servers in an area with a traffic jam in the service area as the temporary primary node upon determining that the size of the area with the traffic jam does not reach a first preset threshold, and the number of control servers in the area with the traffic jam does not reach a second preset threshold, based upon the obtained state detection information.

7. The equipment according to claim 6, wherein the processing unit is further configured:

to select the equipment as the temporary primary node upon determining that a preset urgent event is occurring.

8. The equipment according to claim 6, wherein the processing unit configured to select one of the control servers in the area with the traffic jam as the temporary primary node is configured:

to calculate the ratio of a state parameter of each control server in the area with the traffic jam to a preset reference state parameter respectively based upon the obtained state detection information, to select one of the calculated respective ratios according to a preset selection criterion, and to determine the control server corresponding to the selected ratio as the temporary primary node.

9. The equipment according to claim 6, wherein the triggering unit configured to trigger the temporary primary node to distribute the subscription messages to the control servers satisfying the preset condition is configured:

if the equipment is selected as the temporary primary node, to distribute the subscription messages directly to the control servers satisfying a first preset condition; and if one of the control servers is selected as the temporary primary node, to trigger the temporary primary node to distribute the subscription messages directly to the control servers satisfying a second preset condition.

10. The equipment according to claim 6, wherein the trigger unit configured to trigger the temporary primary node to generate the corresponding coordinated control strategy according to the information acquired by the IP-enabled field devices, and the corresponding processing reports, reported by the respective control servers in response to the subscription messages, and to transmit the generated coordinated control strategy respectively to the corresponding control servers is configured:

if the equipment is selected as the temporary primary node, to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers; and if one of the control servers is selected as the temporary primary node, to trigger the temporary primary node to receive the information acquired by the IP-enabled field devices, and the corresponding processing reports, reported by the respective control servers in response to the received subscription messages, to generate the corresponding coordinated control strategy based upon the obtained respective information acquired by the IP-enabled field devices, and corresponding processing reports, and to transmit the generated coordinated control strategy respectively to the corresponding control servers.

* * * * *